(12) United States Patent
Petersen et al.

(10) Patent No.: US 10,982,766 B2
(45) Date of Patent: Apr. 20, 2021

(54) SHIFTING DEVICE AND DRIVE UNIT FOR A MOTOR VEHICLE

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE); Andreas Lutz, Braunschweig (DE); Hendrik Schröder, Sickte (DE); Christian Meissner, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 407 days.

(21) Appl. No.: 15/769,727

(22) PCT Filed: Oct. 18, 2016

(86) PCT No.: PCT/EP2016/074989
§ 371 (c)(1),
(2) Date: Apr. 19, 2018

(87) PCT Pub. No.: WO2017/071993
PCT Pub. Date: May 4, 2017

(65) Prior Publication Data
US 2018/0306319 A1    Oct. 25, 2018

(30) Foreign Application Priority Data
Oct. 30, 2015   (DE) .................... 10 2015 221 274.2

(51) Int. Cl.
*F16H 63/30*   (2006.01)
*F16D 11/14*   (2006.01)
(Continued)

(52) U.S. Cl.
CPC .......... *F16H 63/304* (2013.01); *F16D 11/14* (2013.01); *F16D 28/00* (2013.01);
(Continued)

(58) Field of Classification Search
CPC .......... F16H 63/304; F16H 2063/3093; F16D 11/14; F16D 28/00; F16D 2011/002; F16D 2063/3063
(Continued)

(56) References Cited

U.S. PATENT DOCUMENTS 9,157,491 B2 *  10/2015  Kirchhoffer ............ F16D 21/02
9,494,201 B2 *  11/2016  Smith .................... F16D 25/082
(Continued)

FOREIGN PATENT DOCUMENTS

CN        101365892 A     2/2009
CN        101878376 A     11/2010
(Continued)

OTHER PUBLICATIONS

International Search Report of PCT Application No. PCT/EP2016/074989, dated Jan. 27, 2017.
(Continued)

*Primary Examiner* — Ha Dinh Ho
(74) *Attorney, Agent, or Firm* — Pearl Cohen Zedek Latzer Baratz LLP (57) ABSTRACT

The invention relates to a shifting device for the selection of rotationally fixed non-rotational couplings of a plurality of coaxial shafts of a motor-vehicle transmission, comprising a displacement sleeve, which can be axially displaced in relation to a housing and which has internal teeth having two axial toothed sections spaced apart from each other by an axial gap, and which coaxially surrounds a plurality of toothed elements that are arranged axially adjacent to each other and that are each non-rotationally connected to one of
(Continued)

the shafts and that each have external teeth corresponding to the internal teeth of the displacement sleeve, wherein the displacement sleeve has a first sleeve part and a second sleeve part that are connected to each other in a manner that is axially fixed and rotationally decoupled, wherein the first sleeve part is a carrier of the first axial toothed section and the second sleeve part is a carrier of the second axial toothed section.

9 Claims, 10 Drawing Sheets (51) Int. Cl.
    *F16D 28/00* (2006.01)
    *F16D 11/00* (2006.01)
(52) U.S. Cl.
    CPC ............. *F16D 2011/002* (2013.01); *F16H 2063/3063* (2013.01); *F16H 2063/3093* (2013.01)
(58) Field of Classification Search
    USPC ........................................................ 74/335
    See application file for complete search history.

(56) References Cited

U.S. PATENT DOCUMENTS

| 9,689,463 | B2* | 6/2017 | Kuehnle | ............... F16D 13/70 |
| 2011/0005882 | A1 | 1/2011 | Quartier et al. | |
| 2011/0031085 | A1 | 2/2011 | Reisch et al. | |
| 2011/0094843 | A1 | 4/2011 | Knowles | |
| 2011/0139565 | A1* | 6/2011 | Acker | ............... F16D 25/10 |
| | | | | 192/48.601 |
| 2011/0214532 | A1 | 9/2011 | Kirchner | |
| 2013/0025995 | A1* | 1/2013 | Krebs | ............... F16D 21/06 |
| | | | | 192/48.8 |
| 2013/0167681 | A1 | 7/2013 | Kii et al. | |
| 2014/0123794 | A1 | 5/2014 | Smetana | |

FOREIGN PATENT DOCUMENTS

| CN | 102192256 A | 9/2011 |
| CN | 103182934 A | 7/2013 |
| CN | 103384786 A | 11/2013 |
| CN | 103597233 A | 2/2014 |
| CN | 101970914 B | 11/2014 |
| DE | 21 25 628 A | 12/1972 |
| DE | 35 10 493 A1 | 10/1985 |
| DE | 101 15 504 A1 | 10/2002 |
| DE | 10 2004 049 274 A1 | 5/2006 |
| DE | 10 2008 045 791 A1 | 5/2009 |
| DE | 10 2008 000 647 A1 | 9/2009 |
| DE | 10 2014 201 251 A1 | 8/2015 |
| EP | 1174632 B1 | 11/2007 |
| FR | 735 724 A | 11/1932 |

OTHER PUBLICATIONS

Search report for German Patent Application No. 10 2015 221 274.2, dated Aug. 10, 2016.

* cited by examiner

SHIFTING DEVICE AND DRIVE UNIT FOR A MOTOR VEHICLE

CROSS-REFERENCE TO RELATED APPLICATIONS

This application is a National Phase Application of PCT International Application No. PCT/EP2016/074989, International Filing Date Oct. 18, 2016, claiming priority of German Patent Application No. 10 2015 221 274.2, filed Oct. 30, 2015, which is hereby incorporated by reference.

BACKGROUND OF THE INVENTION

The invention relates to a shifting device for the selection of non-rotational couplings of a plurality, especially three, coaxial shafts of a motor vehicle transmission, comprising a displacement sleeve which can be axially displaced relative to a housing, which has internal teeth having two axial toothed sections spaced apart from each other by an axial gap, and which coaxially surrounds a plurality, especially three, toothed elements that are arranged axially adjacent to each other, that are each non-rotationally connected to one of the shafts and that each have external teeth corresponding to the internal teeth of the displacement sleeve.

The invention also relates to a drive unit for a motor vehicle, comprising:
- an electric machine having a stator and a rotor that is arranged rotatably in the stator,
- a gear arrangement having a plurality, especially three, shafts that are arranged coaxially relative to each other and that each have a toothed element with external teeth at their connection ends that extend beyond each other in a stepped manner, and
- a shifting device with an axially displaceable displacement sleeve, which coaxially surrounds the toothed elements and which has internal teeth corresponding to the external teeth of the toothed elements and having two axial toothed sections spaced apart from each other by an axial gap.

Such shifting devices and drive units for motor vehicles are disclosed in German patent application DE 10 2014 201 251 A1.

Modern motor vehicle transmissions are characterized by a plurality of selection options for the gear and/or mode of operation, along with a very compact design. This is achieved, among other things, by the coaxial nesting of shafts and the close proximity among relative rotational elements in the transmission. The term "relative rotational elements" in the present context refers to elements of a transmission that are mounted so as to be rotatable relative to each other. These can be, for example, shafts that can rotate relative to each other or else relative to a housing. On the other hand, housing-fixed elements that execute a rotation relative to the shafts are also encompassed by this term. As a rule, changes in the gear or mode of operation, which are referred to here as shifting procedures, are effectuated by changes in the coupling between such relative rotational elements. Here, typical shifting elements are brakes (for example, for the non-rotational coupling of a shaft to a housing) and couplings (for example, for the non-rotational coupling of two shafts to each other). Here, the tight nesting of the elements often allows the combination of multiple shifting functions in a shifting module or even requires such an integration.

The above-referenced generic publication discloses such a multiple shifting module that allows different, positively connected couplings between three coaxial shafts. Two of the three coaxial shafts are spaced axially apart from each other and a third shaft passes coaxially through both of them. The ends of the two shafts mentioned first each have a toothed element. The toothed element of the third shaft extends in the gap between these shafts. All of the toothed elements have identical external teeth. The three toothed elements are surrounded by a displacement sleeve that has corresponding internal teeth. These internal teeth, however, are not axially continuous but rather comprise two axial toothed sections spaced apart from each other by a gap. Depending on the displacement position of the displacement sleeve, its internal teeth can intermesh with the external teeth of one, two (in varying pairings) or all three toothed elements, thereby coupling them to each other. It is evident that the displacement sleeve has to be able to rotate along with the shafts, that is to say, it has to be mounted in the housing so as to be rotatable. In order to be able to bring about the axial displacement of the displacement sleeve that is required for a shifting procedure, that is to say, for a change in the coupling constellation of the shafts, said displacement sleeve is mounted in an actuation sleeve that surrounds it. It is mounted on radial bearings that absorb axial forces, that is to say, the displacement sleeve and the actuation sleeve are rotationally uncoupled from each other; by the same token, axial forces that act on the actuation sleeve can be transmitted to the displacement sleeve. The actuation sleeve, which, in turn is mounted so as to slide in a housing-fixed, slotted guide sleeve, is connected via a lever connection to a motor drive that effectuates the axial movement needed for a shifting procedure.

The prior art shifting device is relatively bulky and only allows coupling among the above-mentioned shafts. A coupling of one or more of these shafts to external relative rotational elements of the transmission such as, for example, the rotor of an electric machine and/or the transmission housing, is not possible with the prior-art device. The complexity of the coupling constellations that can be implemented with it is correspondingly limited.

SUMMARY OF THE INVENTION

It is the objective of the present invention to put forward an improved shifting device and thus an improved drive unit for a motor vehicle in which more complex coupling constellations can be implemented.

This objective is achieved in conjunction with the features of the generic part of claim 1 in that the displacement sleeve has a first sleeve part and a second sleeve part which are connected to each other in a manner that is axially fixed and rotationally uncoupled, whereby the first sleeve part is the carrier of the first axial toothed section and the second sleeve part is the carrier of the second axial toothed section.

The objective is also achieved in conjunction with the features of the generic part of claim 7 in that the shifting device is configured as such a shifting device according to the invention, whereby the second sleeve part of the displacement sleeve is connected to the rotor of the electric machine.

Preferred embodiments of the invention are the subject matter of the dependent claims.

The essence of the invention is the two-part configuration of the displacement sleeve. The two parts are axially connected to each other, thereby retaining a joint axial displacement capability of the entire displacement sleeve. However, in contrast to the state of the art, the two sleeve parts are rotationally uncoupled from each other. In other words, they are mounted so as to be rotatable relative to each other. Here, each of the two sleeve parts carries one of the two axial toothed sections of the internal teeth. The person skilled in the art will recognize in this context that the provision of two axial toothed sections is by no means to be understood as the maximum number of such axial toothed sections. Of course, it is fundamentally possible to provide more than one axial toothed section within each sleeve part, so that the functions of the state of the art can be fulfilled with one single sleeve part. In this context, the only aspect that is essential for the invention is that each of the two sleeve parts, which are rotationally uncoupled from each other, has to carry at least one axial toothed section. This measure makes it possible to couple the toothed elements to different external relative rotational elements. In this context, the term "external relative rotational elements" refers to relative rotational elements that are not one of the coaxial shafts that carry the toothed elements. In particular, one of the external relative rotational element can be the housing and another external relative rotational elements can be the rotor of an electric machine. In this configuration, which constitutes the preferred embodiment of the drive unit according to claim 7, depending on the shifting position, different toothed elements can be affixed to the housing by means of the axial toothed section of one of the sleeve parts in order to support a torque, and other toothed elements can be coupled to the rotor of the electric machine by means of the axial toothed section of the other sleeve part in order to deliver a torque. Therefore, the invention implements two displacement sleeves that can rotate independently of each other but that can be displaced together, which are described here as sleeve parts of a two-part displacement sleeve.

As a result, much more complex shifting constellations, which especially also comprise relative rotational elements, can be achieved.

According to a preferred embodiment, it is provided for the first sleeve part and the second sleeve part to overlap each other axially and to be mounted relative to each other in the overlapping area by means of a radial bearing that absorbs axial forces. A wide overlapping area offers the possibility of a bearing that is protected against tipping. In the case of a likewise fundamentally conceivable axial mounting of the sleeve parts with their end faces against each other, the protection against tipping would have to be implemented in some other manner.

A similar thought is the basis of another advantageous embodiment of the invention, wherein the toothed elements are configured as nested taper flanges that are axially mounted relative to each other in pairs. Of course, an essentially cylindrical configuration of the toothed elements is likewise conceivable. The configuration as nested taper flanges, however, allows an axial overlapping area between each of two toothed elements and this can be used to arrange a radial bearing. This highly integrated design is especially advantageous in terms of the installation space needed.

In order to create the axial drive of the displacement sleeve so as to require as little installation space as possible, it is preferably provided for the displacement sleeve to be mounted by means of an axially extending threaded structure in an actuation sleeve that coaxially surrounds the displacement sleeve. In other words, the displacement sleeve can be displaced axially by a sort of spindle drive. Here, it is obvious to the person skilled in the art that the actuation sleeve should only interact with the displacement sleeve in the area of one of the sleeve parts. The actuation sleeve can be rotated around its lengthwise axis by means of a motorized actuating drive. In a preferred embodiment of the invention, the actuating drive is non-rotationally mounted on a housing. This pertains to the preferred embodiment in which the toothed elements that intermesh with the first sleeve part are each to be affixed to the housing. Therefore, in this embodiment, the first sleeve part of the displacement sleeve also has to be non-rotationally mounted on the housing. The actuation sleeve rotates relative thereto, driven by a housing-fixed actuating drive. In contrast, the second sleeve part is freely rotatable, but during an axial displacement of the first sleeve part, it is likewise axially displaced.

The displacement sleeve is preferably non-rotationally mounted so as to be axially displaced on a projection that is firmly affixed to the housing and that projects into the actuation sleeve. As explained, the displacement sleeve is surrounded radially on the inside as well as radially on the outside by elements that are rotatable relative to the housing. In order to nevertheless create a rotational coupling with the housing, the described embodiment provides for a projection that is situated between the radially inner shafts and the radially outer actuation sleeve and that extends into the displacement sleeve, which is mounted on said projection, especially mounted so as to slide.

As already explained above, in the preferred embodiment of a drive unit according to the invention, the second sleeve part is connected to the rotor of an electric machine. The arrangement of the electric machine relative to the shifting device according to the invention can be configured here in various ways. In a first embodiment, it is provided for the displacement sleeve to be arranged coaxially to the rotor and for the second sleeve part to be non-rotationally connected to the rotor. In particular, in this embodiment, the shifting device according to the invention can be arranged in the (radial) interior of the electric machine. This is particularly advantageous in terms of the axial installation space needed.

However, cases are also conceivable in which the electric machine is arranged so as to be axially and/or radially offset relative to the shifting device according to the invention, especially relative to its displacement sleeve. In such a configuration, it is preferably provided for the second sleeve part to be connected to the rotor of the electric machine by means of a gear stage. A special feature of this embodiment is also the fact that a transmission can be implemented between the rotor and the second sleeve part. The term "gear stage" in this context is to be understood in a broad sense. It can be a simple, direct gear stage or a more complex arrangement, for example, in the form of a planetary gear set in which the second sleeve part constitutes the sun while the rotor constitutes the internal ring gear of the planetary gear set.

Additional features and advantages of the invention can be gleaned from the specific description below and from the drawings below.

BRIEF DESCRIPTION OF THE DRAWINGS

The figures show the following:

FIG. 1—a cross-sectional view of an embodiment of a drive unit according to the invention, FIG. 2—the shifting device of the drive unit of FIG. 1 in a first shifting position, FIG. 3—the shifting device of FIG. 2 in a second shifting position, FIG. 4—the shifting device of FIG. 2 in a third shifting position, FIG. 5—the shifting device of FIG. 2 in a fourth shifting position, FIG. 6—the shifting device of FIG. 2 in a fifth shifting position, FIG. 7—the shifting device of FIG. 2 in a sixth shifting position, FIG. 8—the shifting device of FIG. 2 in a seventh shifting position, FIG. 9—the shifting device of FIG. 2 in an eighth shifting position, FIG. 10—the shifting device of FIG. 2 in a ninth shifting position.

The same reference numerals in the figures designate the same or analogous elements.

DETAILED DESCRIPTION OF THE INVENTION

Figure 1:
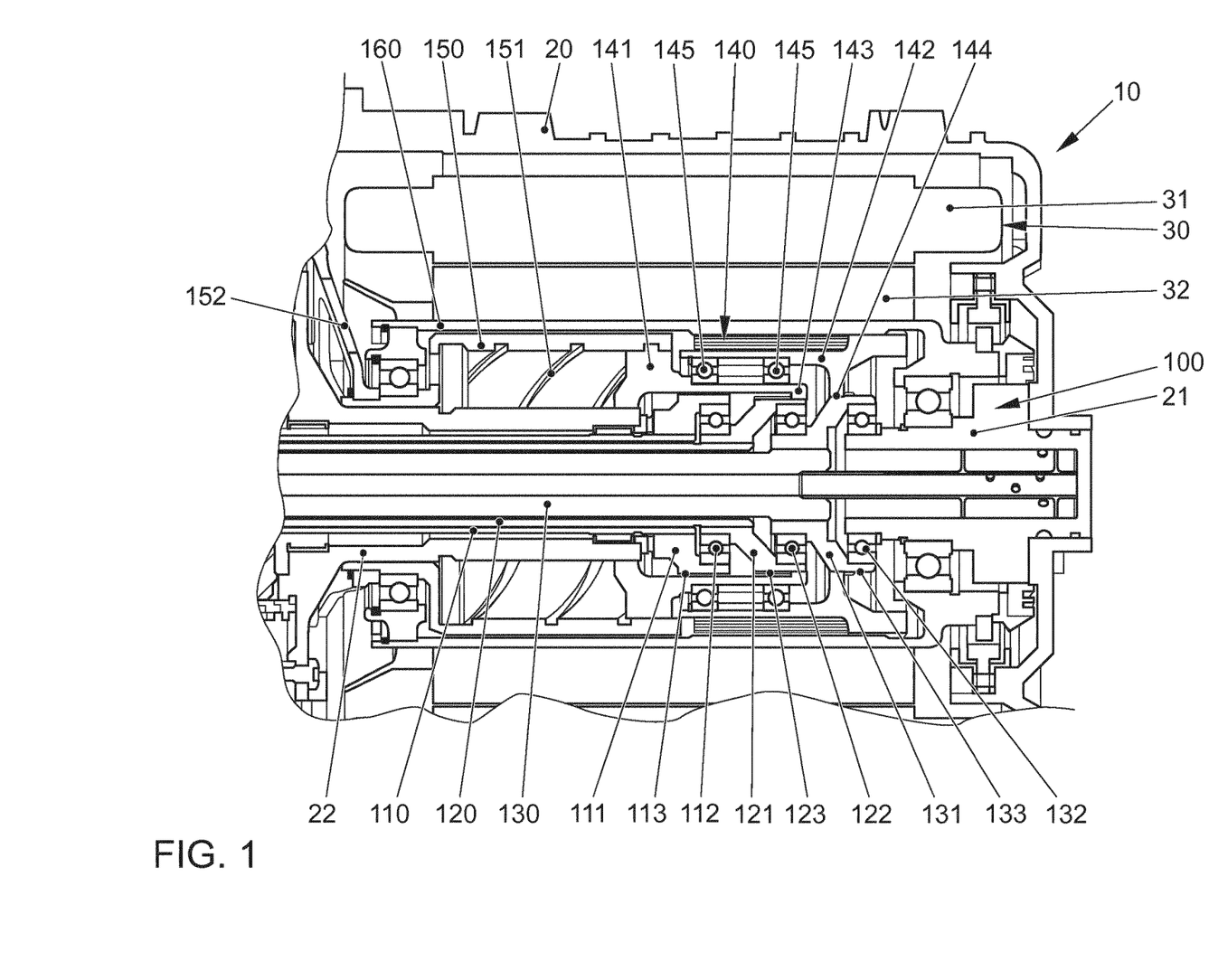

FIG. 1 shows a cross-sectional view of an embodiment of a drive unit 10 according to the invention in which a shifting device 100 according to the invention is used.

The drive unit 10 comprises a housing 20 in which the other device components are contained. In the embodiment shown here, in particular, an electric machine 30 is integrated into the housing 20, the stator 31 of the electric machine is mounted so as to be affixed to the housing and its rotor 32 is rotatably mounted in the stator 31. A shifting device is arranged radially inside the rotor 32 and, with this shifting device, three coaxial shafts 110, 120, 130 can be selectively coupled to the rotor 32 or to the housing 20. The three shafts 110, 120, 130 pass through each other coaxially, whereby a first shaft 110 is the radially outermost shaft, a second shaft 120 is the radially middle shaft, and a third shaft 130 is the radially innermost shaft. The shaft ends of the coaxial shafts 110, 120, 130 extend beyond each other in a stepped manner, whereby the end of the second shaft 120 extends beyond the end of the first shaft 110, and the end of the third shaft 130 extends beyond the end of the second shaft 120. The ends of the shafts 110, 120, 130 each have a toothed element 111, 121, 131, and these are configured as nested taper flanges in the embodiment shown. The first toothed element 111 is firmly connected to the end of the first shaft 110 and partially overlaps the second toothed element 121 of the second shaft 120 in the axial direction. A ball bearing 112 is arranged in the overlapping area of the toothed elements 111, 121, and the two toothed elements 111, 121 are supported relative to each other via this ball bearing 112. The second toothed element 121, which is firmly arranged on the end of the second shaft 120, partially overlaps the third toothed element 131 in the axial direction, which in turn is affixed to the end of the third shaft 130. A ball bearing 122 is arranged in the overlapping area between the second toothed element 121 and the third toothed element 131, and the two toothed elements 121, 131 are supported relative to each other via this ball bearing 122. The third toothed element 132 partially overlaps a housing-fixed journal 21 in the axial direction and is supported relative to it via another ball bearing 132. Each toothed element 111, 121, 131 has external teeth 113, 123, 133 in its radially outermost area. These external teeth 113, 123, 133 serve to interact with a displacement sleeve 140 that coaxially surrounds the three toothed elements 111, 121, 131. Here, the displacement sleeve 140 consists of two sleeve parts 141, 142 that overlap each other axially. Each sleeve part 141, 142 carries an axial toothed section of internal teeth, namely, the first sleeve part 141 carries a first axial toothed section 143 and the second sleeve part 142 carries a second axial toothed section 144. The internal teeth 143, 144 of the displacement sleeve 140 correspond to the external teeth 113, 123, 133 of the toothed elements 111, 121, 131. In their overlapping area, on the one hand, the sleeve parts 141, 142 are rotationally uncoupled from each other via ball bearings, but on the other hand, they are connected to each other in a manner that transmits axial forces. Deep-groove ball bearings, for example, can be used to fulfill this dual function. It can be seen that, depending on the axial displacement position of the displacement sleeve 140, a different intermeshing can be achieved between the axial toothed sections 143, 144 of the internal teeth of the displacement sleeve 140 on the one hand and the external teeth 113, 123, 133 of the toothed elements 111, 121, 131 on the other hand.

In the embodiment shown, the first sleeve part 141, which partially surrounds the coaxial shafts 110, 120, 130, is mounted non-rotationally and so as to be axially displaceable on a housing-fixed projection 22. In the embodiment shown, the second sleeve part 142 is non-rotationally connected to the rotor 32 of the electric machine 30 via a coupling sleeve 160. As a result, in the embodiment shown here, the specific shaft 110, 120, 130 whose associated external teeth 113, 123, 133 intermesh with the first axial toothed section 143 of the internal teeth of the displacement sleeve 140 is non-rotationally coupled to the housing 20, whereas the specific shaft 110, 120, 130 whose associated external teeth 113, 123, 133 intermesh with the second axial toothed section 144 of the internal teeth of the displacement sleeve 140 is non-rotationally coupled to the rotor 32 of the electric machine 30.

In order to actuate the displacement sleeve, that is to say, in order to displace it axially, an actuation sleeve 150 is provided that partially coaxially surrounds the first sleeve part 141 and that is connected to the first sleeve part 141 by means of a threaded structure 151. Therefore, a rotation of the actuation sleeve 150 brings about an axial movement of the displacement sleeve 140 in the manner of a spindle drive, namely, of its first sleeve part 141 as well as of its second sleeve part 142 which, however, as explained above, is rotationally uncoupled from the first sleeve part 141 via the bearing 145. The precise angular rotation of the actuation sleeve 150 is effectuated by an electric actuating drive (not shown here) that is coupled on by means of a coupling wheel 152.

Figure 2A:
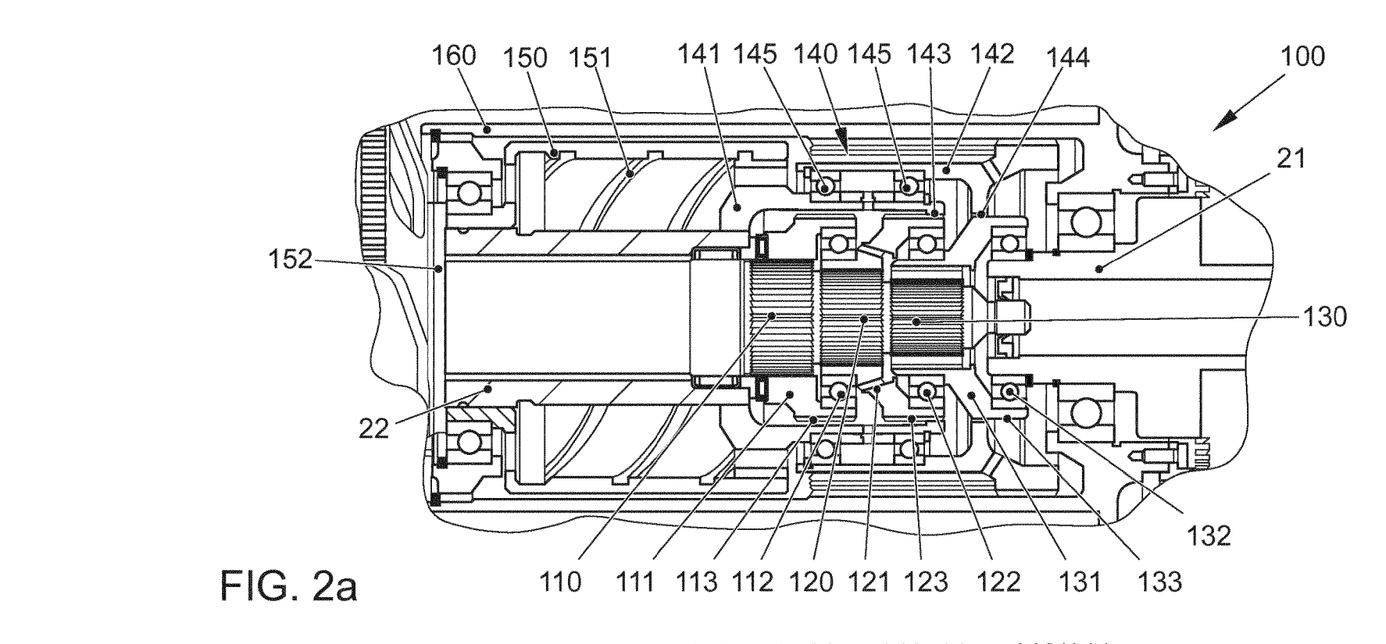
Figure 2B:
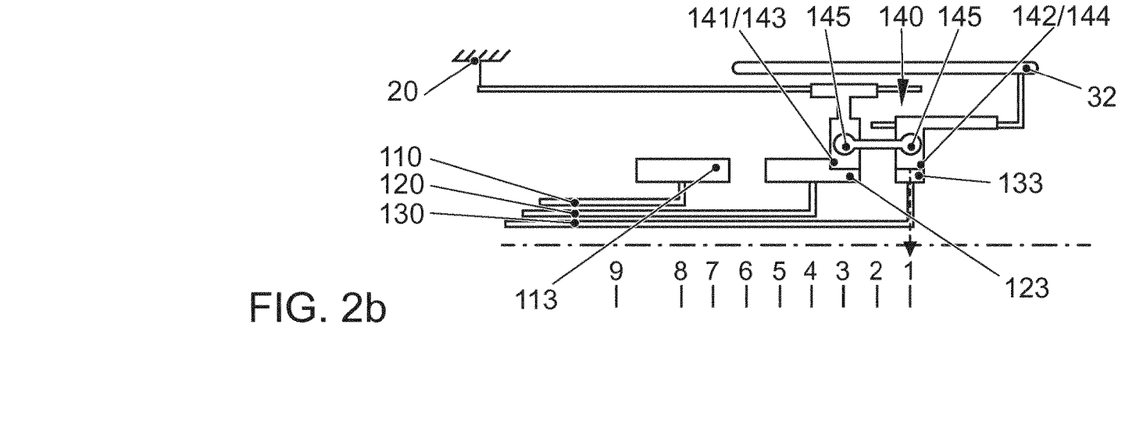

FIG. 2 shows the shifting device 100 of the drive unit 10 of FIG. 1 in a first shifting position. Partial FIG. 2a shows the shifting device 100 here in a partial cross-sectional view; partial FIG. 2b shows the shifting device 100 in a highly schematic view. In this shifting position, the first axial toothed section 143 of the internal teeth intermeshes with the external teeth 123 of the second toothed element 121. In this shifting position, the second axial toothed section 144 intermeshes with the external teeth 133 of the third toothed element 131. The second shaft 120 is thus affixed to the housing 20, whereas the third shaft 130 is non-rotationally coupled to the rotor 32. In this shifting position, the first shaft 110 is not influenced by the shifting device 100.

Figure 3A:
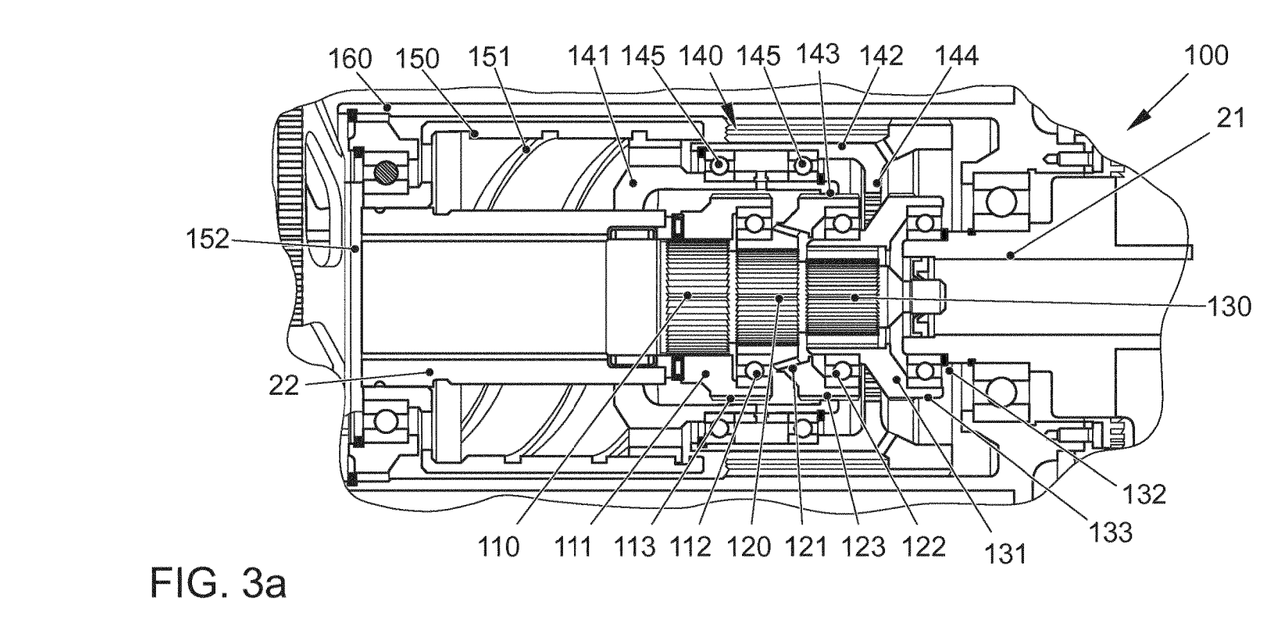
Figure 3B:
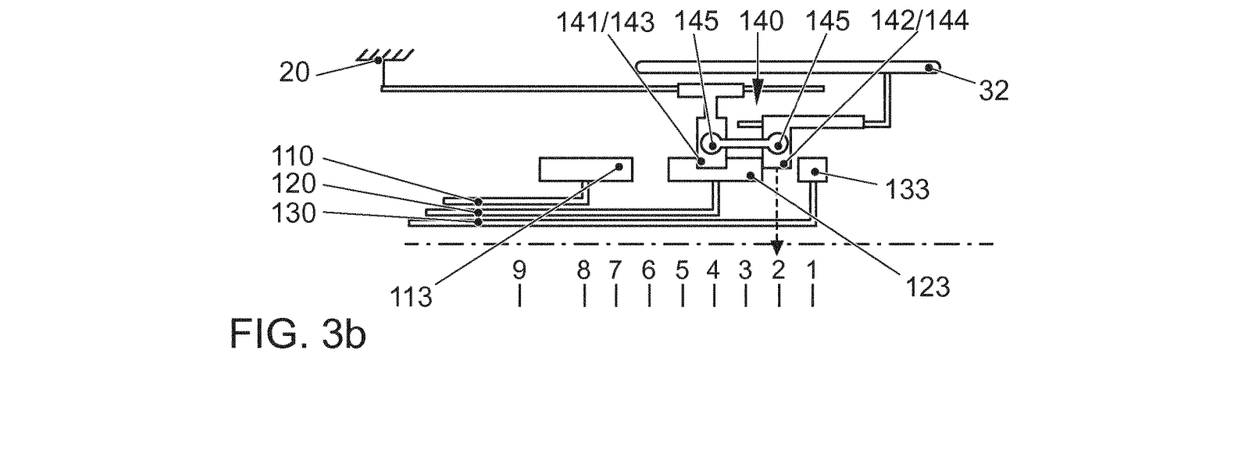

FIG. 3 shows the shifting device 100 in the same view as in FIG. 2, whereby here, however, the shifting device 100 is in a second shifting position in which the displacement sleeve 140 is displaced slightly to the left, so that its second sleeve part 142 is not intermeshed with the third toothed element 133.

Figure 4A:
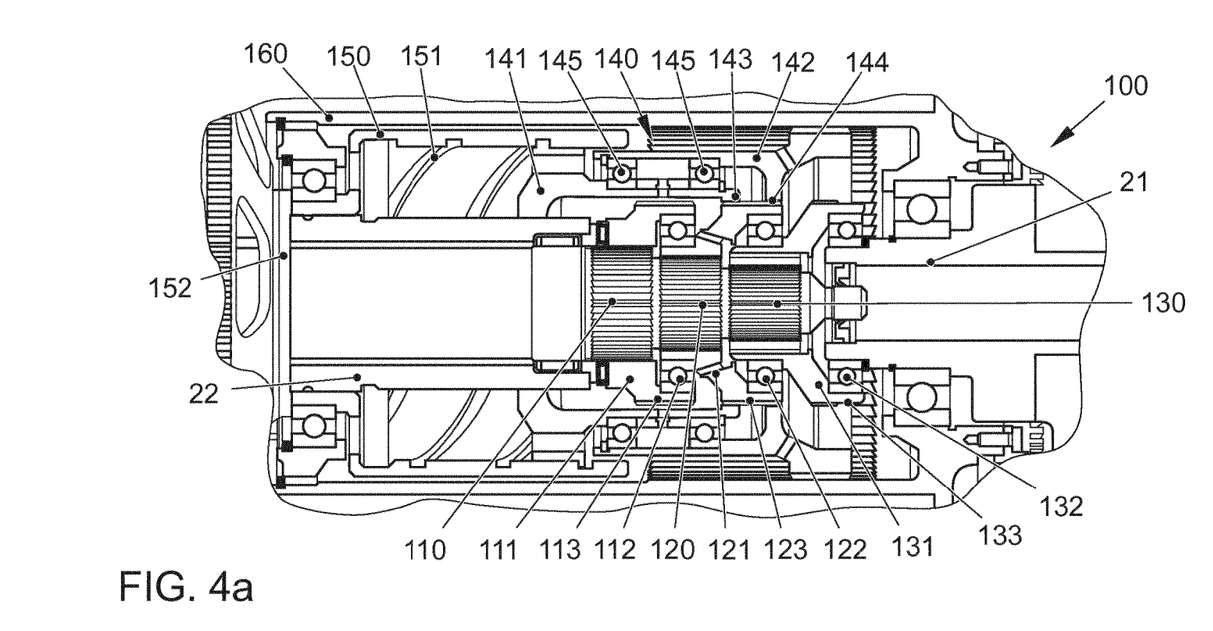
Figure 4B:
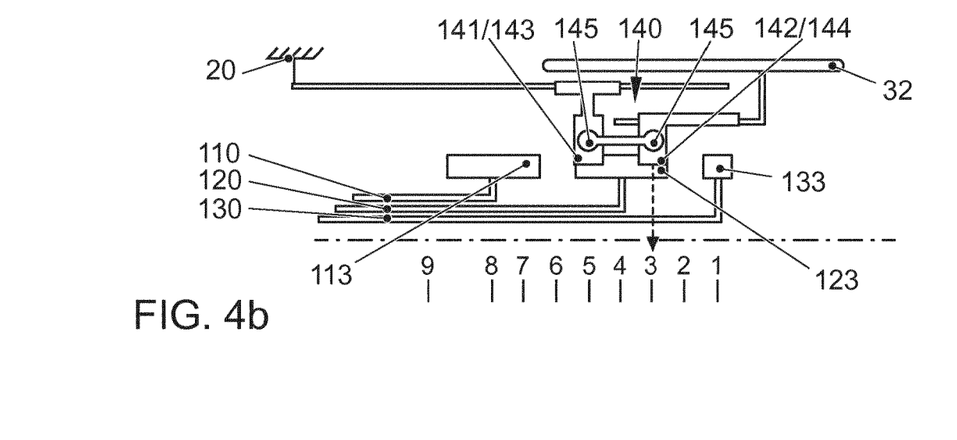

FIG. 4 shows the shifting device 100 in a third shifting position in which the displacement sleeve 140 is displaced even further to the left, so that the first sleeve part 141 as well as the second sleeve part 142 intermesh with the second toothed element 121. In this position, the second shaft 120 as well as the rotor 32 are affixed to the housing 20.

Figure 5A:
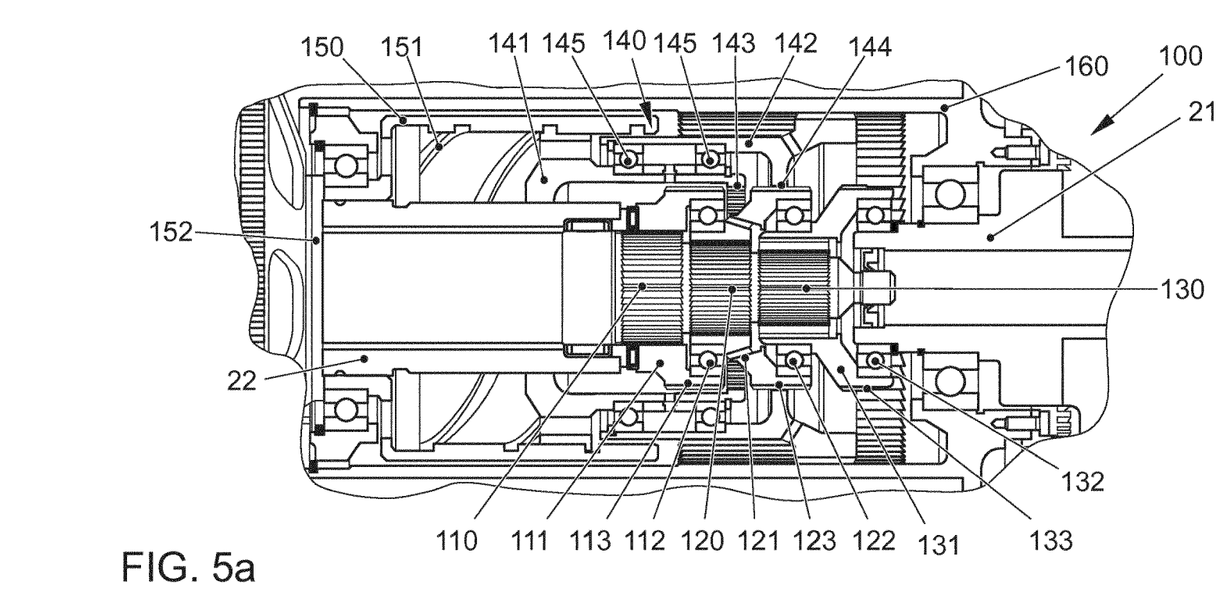
Figure 5B:
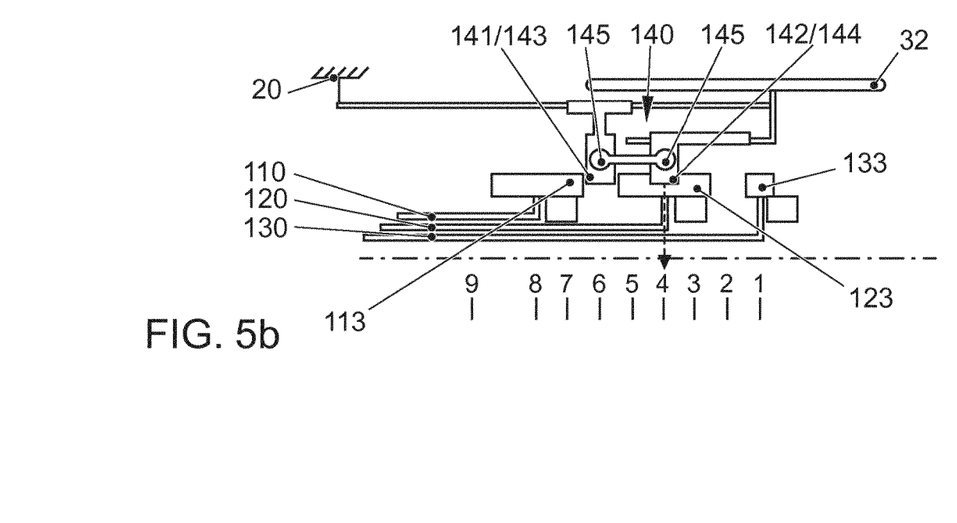

FIG. 5 shows the shifting device 100 in a fourth shifting position in which the displacement sleeve 140 is displaced even further to the left, so that the first sleeve part 141 is not intermeshed with the toothed element 121 and only the second sleeve part 142 intermeshes with the second toothed element 122. In this shifting position, the second shaft 120 is non-rotationally connected to the rotor 32.

Figure 6A:
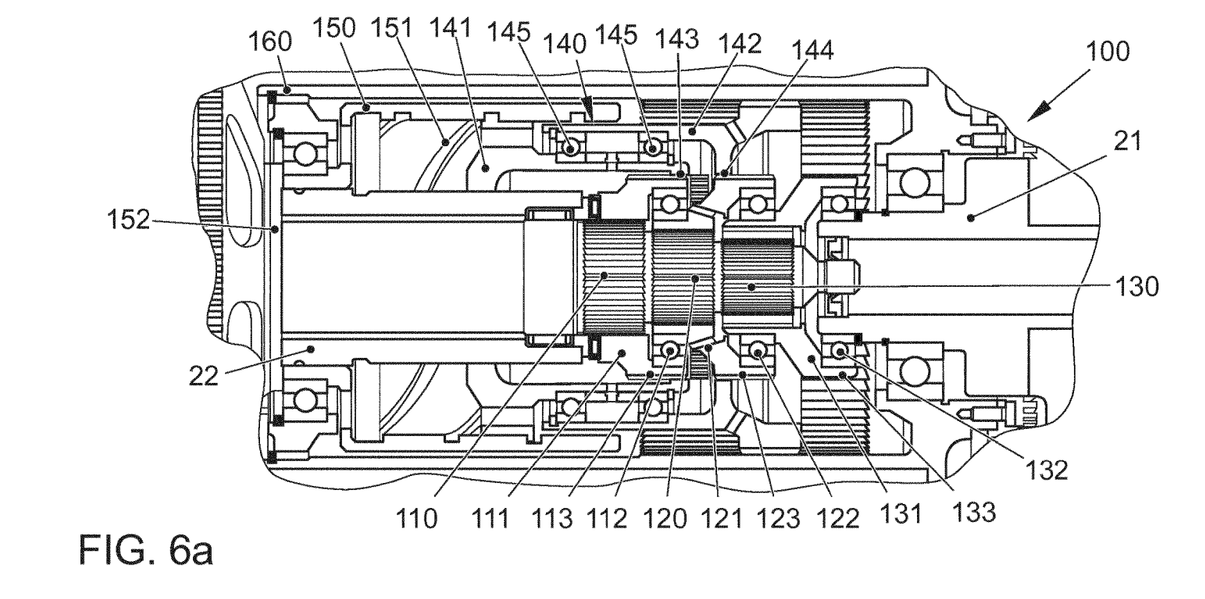
Figure 6B:
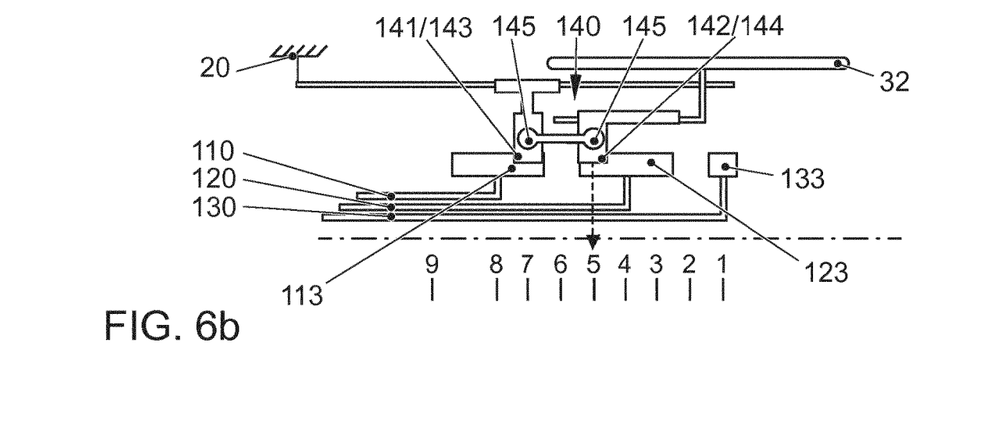

FIG. 6 shows the shifting device 100 in a fifth shifting position in which the displacement sleeve 140 is displaced even further to the left. Here, the first sleeve part 141 intermeshes with the first toothed element 111 and the second sleeve part 142 intermeshes with the second toothed element 121. In this shifting position, the first shaft 110 is affixed to the housing 20, whereas the second shaft 120 is non-rotationally connected to the rotor 32.

Figure 7A:
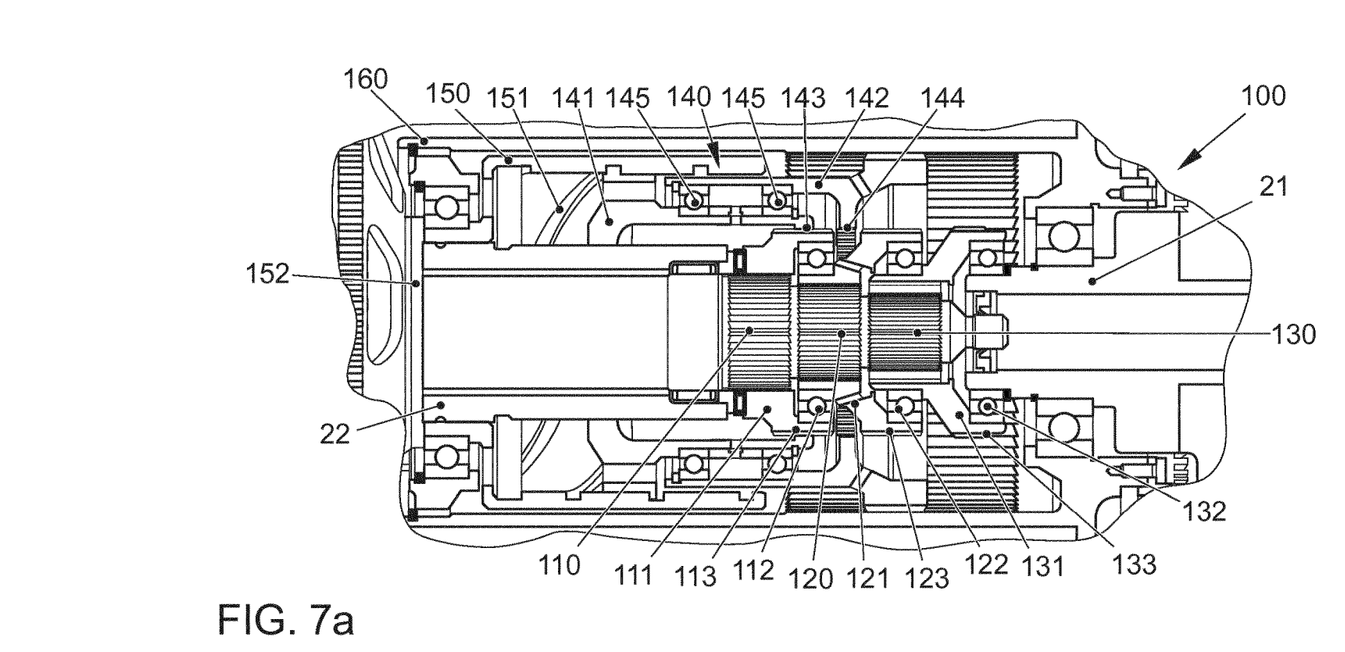
Figure 7B:
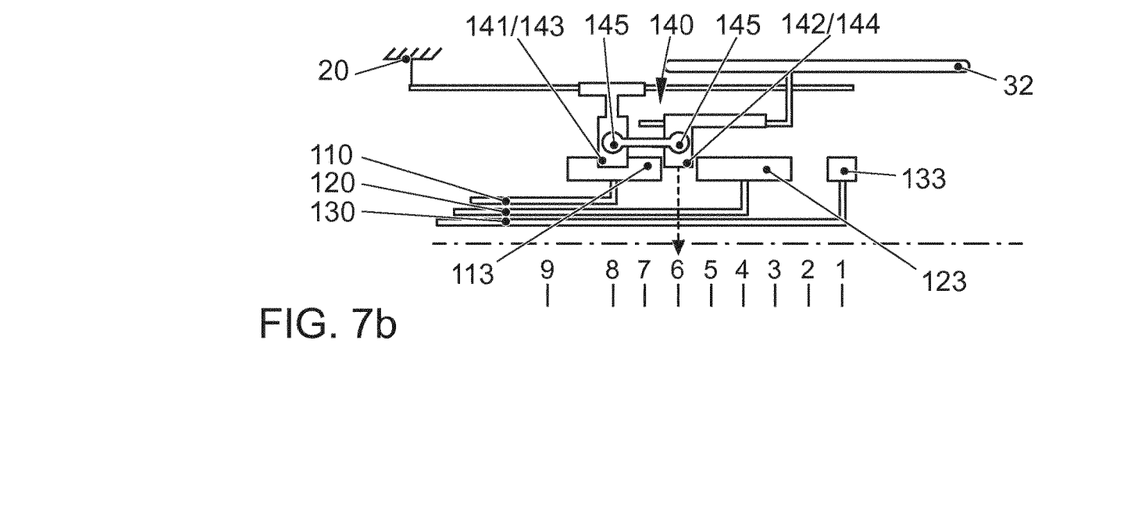

FIG. 7 shows the shifting device 100 in a sixth shifting position in which the displacement sleeve 140 is displaced even further to the left. Here, the second sleeve part 142 is no longer intermeshed with the second toothed element 121, whereas the first shaft 110 is still affixed to the housing 20 via the first sleeve part 141.

Figure 8A:
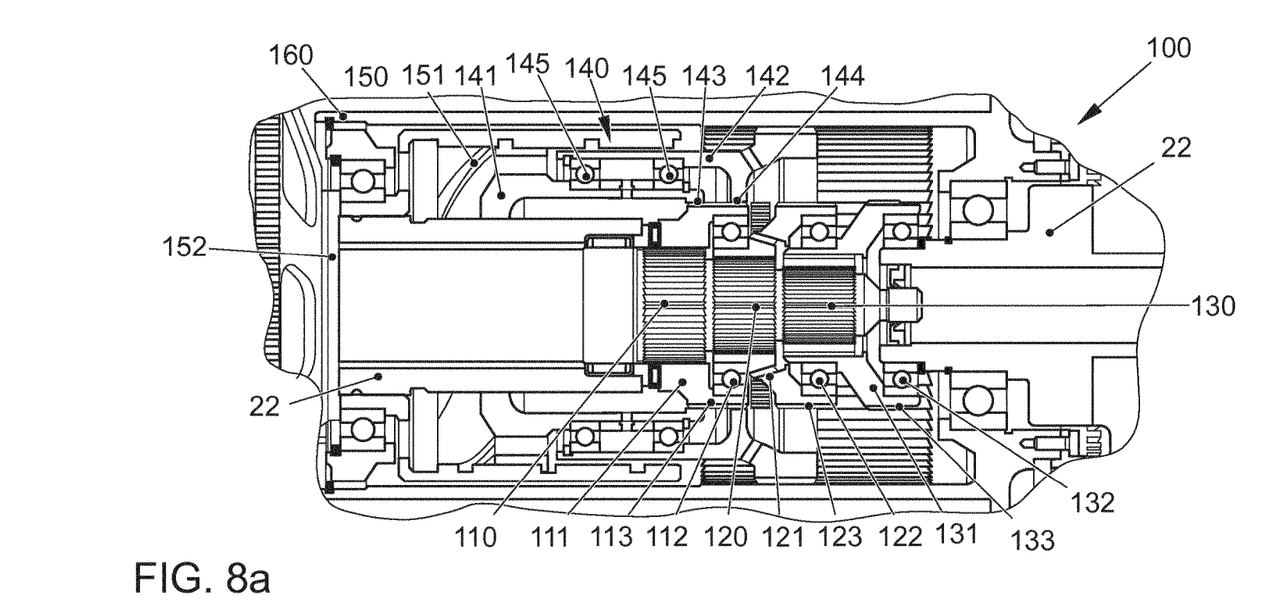
Figure 8B:
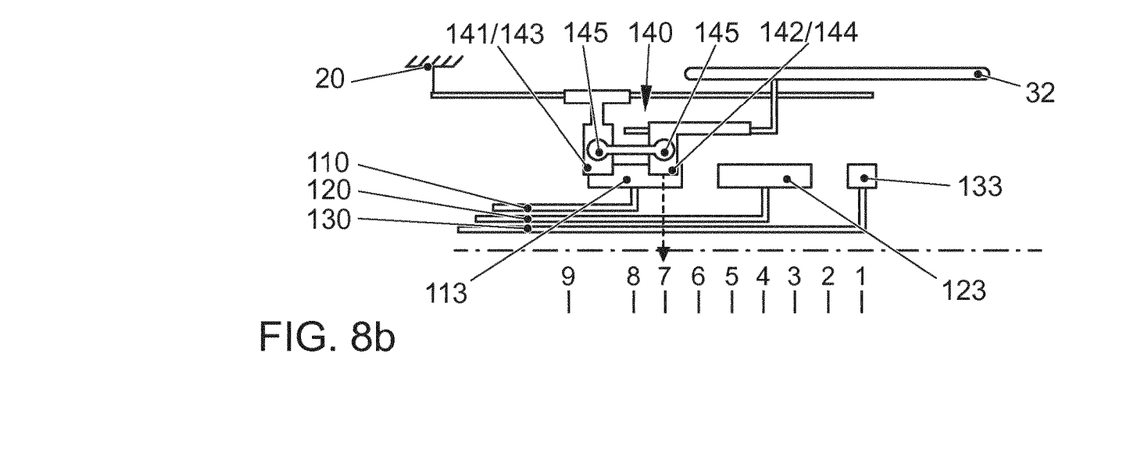

FIG. 8 shows the shifting device 100 in a seventh shifting position in which the displacement sleeve 140 is displaced even further to the left. Here, the first sleeve part 141 as well as the second sleeve part 142 intermesh with the first toothed element 111. In this shifting position, the shaft 110 and the rotor are affixed to the housing 20.

Figure 9A:
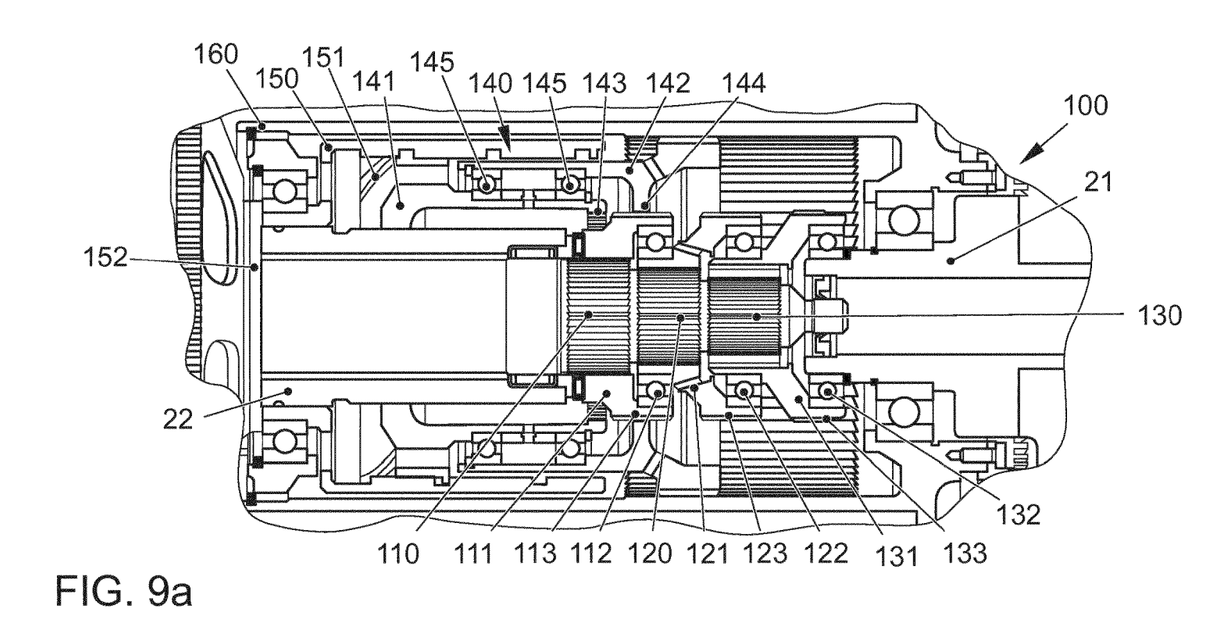
Figure 9B:
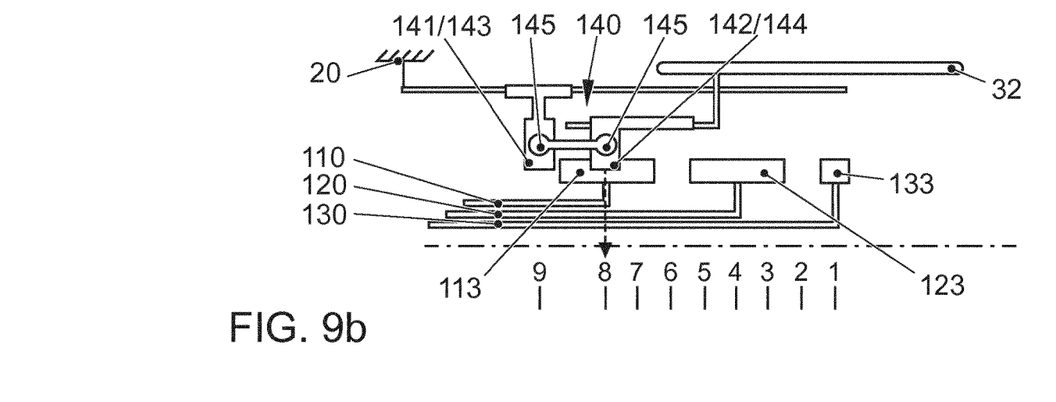

FIG. 9 shows the shifting device 100 in an eighth shifting position in which the displacement sleeve 140 is displaced even further to the left. Here, only the second sleeve part 142 intermeshes with the first toothed element 111. In this shifting position, the first shaft is non-rotationally connected to the rotor 32.

Figure 10A:
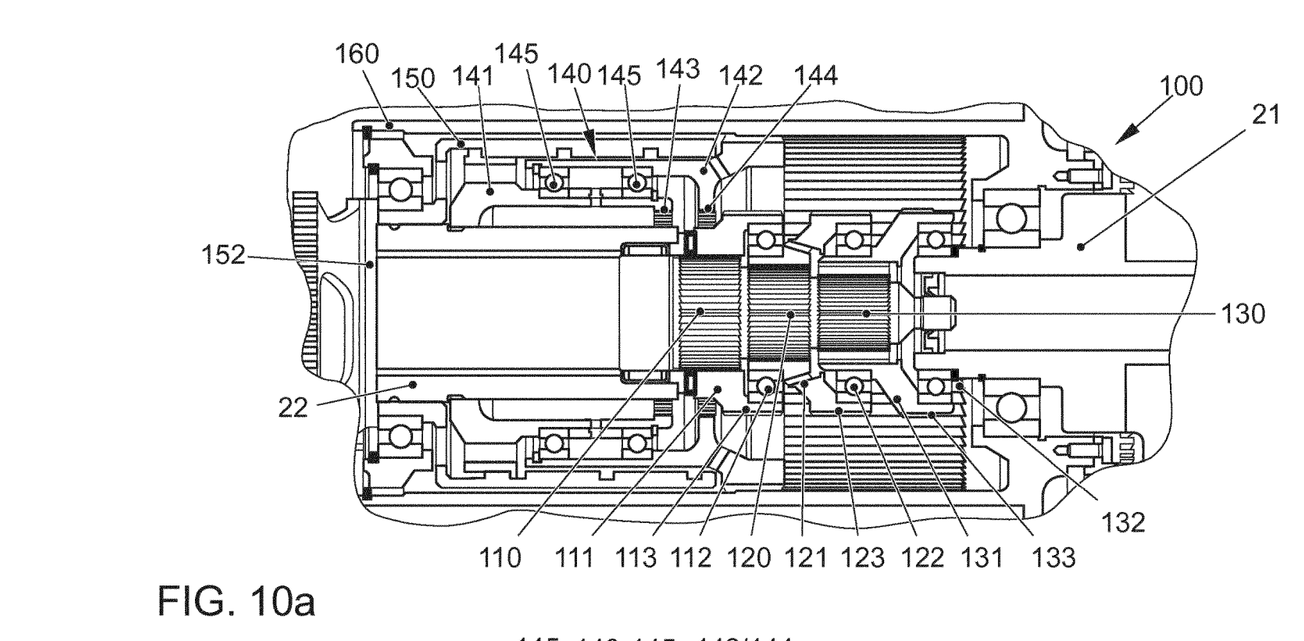
Figure 10B:
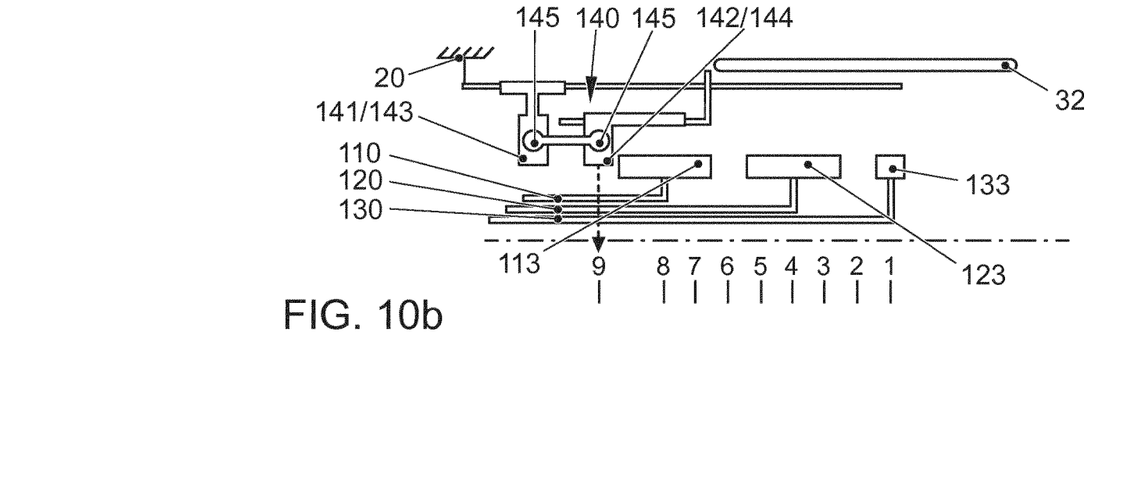

FIG. 10 shows the shifting device 100 in a ninth shifting position in which the displacement sleeve 140 is displaced maximally to the left. Here, none of the sleeve parts 141, 142 intermesh with any toothed elements. All of the relative rotational elements, that is to say, the first shaft 110, the second shaft 120, the third shaft 130, the rotor 32 and the housing 20, can be independently rotated relative to each other.

Of course, the embodiments discussed in the specific description and shown in the figures constitute merely illustrative examples of the present invention. Within the scope of this disclosure, the person skilled in the art is provided with a wide array of variation options. In particular, configurations are conceivable in which the shifting device 100 is not arranged coaxially and/or radially within the rotor 32. Rather, the electric machine 30 can also be arranged axially and/or radially offset relative to the shifting device 100. In this case, the rotational coupling between the rotor 32 and the second sleeve part 142 is preferably effectuated by means of a simple or a complex gear stage.

LIST OF REFERENCE NUMERALS 10 drive unit
20 housing
21 housing-fixed journal
22 housing-fixed projection
30 electric machine
31 stator
32 rotor
100 shifting device
110 first shaft
111 first toothed element
112 first bearing
113 external teeth of 111
120 second shaft
121 second toothed element
122 second bearing
123 external teeth of 121
130 third shaft
131 third toothed element
132 third bearing
133 external teeth of 131
140 displacement sleeve
141 first sleeve part
142 second sleeve part
143 first axial toothed section
144 second axial toothed section
145 bearing
150 actuation sleeve
151 threaded structure
152 coupling wheel
160 coupling sleeve

The invention claimed is:

1. A shifting device for the selection of non-rotational couplings of a plurality of coaxial shafts of a motor vehicle transmission, comprising:
a displacement sleeve which can be axially displaced relative to a housing, which has internal teeth having two axial toothed sections spaced apart from each other by an axial gap, and which coaxially surrounds a plurality of toothed elements that are arranged axially adjacent to each other, that are each non-rotationally connected to one of the shafts and that each have external teeth corresponding to the internal teeth of the displacement sleeve,
wherein the displacement sleeve has a first sleeve part and a second sleeve part which are connected to each other in a manner that is axially fixed and rotationally uncoupled,
whereby the first sleeve part is the carrier of the first axial toothed section and the second sleeve part is the carrier of the second axial toothed section.

2. The shifting device according to claim 1, wherein the first sleeve part and the second sleeve part overlap each other axially and are mounted relative to each other in the overlapping area by means of a radial bearing that absorbs axial forces.

3. The shifting device according to claim 1, wherein the toothed elements are configured as nested taper flanges that are axially mounted relative to each other in pairs.

4. The shifting device according to claim 1, wherein the displacement sleeve is mounted by means of an axially extending threaded structure in an actuation sleeve that surrounds the displacement sleeve coaxially.

5. The shifting device according to claim 4, wherein the actuation sleeve can be rotated around its lengthwise axis by means of a motorized actuating drive.

6. The shifting device according to claim 4 wherein the displacement sleeve is non-rotationally mounted so as to be axially displaced on a projection that is firmly affixed to the housing and that projects into the actuation sleeve.

7. A drive unit for a motor vehicle, comprising
an electric machine having a stator and a rotor that is arranged rotatably in the stator,
a gear arrangement having a plurality of shafts that are arranged coaxially relative to each other and that each have a toothed element with external teeth at their connection ends that extend beyond each other in a stepped manner, and a shifting device for selection of non-rotational couplings of the plurality of shafts, wherein the shifting device includes an axially displaceable displacement sleeve, which coaxially surrounds the toothed elements of the plurality of shafts, and the displacement sleeve comprises:

internal teeth corresponding to the external teeth of the toothed elements of the plurality of shafts, wherein the internal teeth have two axial toothed sections spaced apart from each other by an axial gap, wherein each of the two axial toothed sections are non-rotationally connected to one of the plurality of shafts, and a first sleeve part and a second sleeve part which are connected to each other in a manner that is axially fixed and rotationally uncoupled, wherein the first sleeve part is the carrier of the first axial toothed section and the second sleeve part is the carrier of the second axial toothed section, and the second sleeve part of the displacement sleeve is connected to the rotor of the electric machine.

8. The drive unit according to claim 7, wherein the displacement sleeve is arranged coaxially to the rotor and the second sleeve part is non-rotationally connected to the rotor.

9. The drive unit according to claim 8, wherein the second sleeve part is connected to the rotor of the electric machine by means of a gear stage so as to be axially and/or radially offset relative to the displacement sleeve.

* * * * *